(12) United States Patent
Peeters et al.

(10) Patent No.: US 12,499,516 B2
(45) Date of Patent: Dec. 16, 2025

(54) IMAGE INTENSITY CORRECTION IN MAGNETIC RESONANCE IMAGING

(71) Applicant: KONINKLIJKE PHILIPS N.V., Eindhoven (NL)

(72) Inventors: Johannes Martinus Peeters, Nuenen (NL); Shuo Zhang, Goettingen (DE); Guillaume Rudolf Petrus Thelissen, Best (NL)

(73) Assignee: Koninklijke Philips N.V., Eindhoven (NL)

( * ) Notice: Subject to any disclaimer, the term of this patent is extended or adjusted under 35 U.S.C. 154(b) by 342 days.

(21) Appl. No.: 17/928,959

(22) PCT Filed: Jul. 7, 2021

(86) PCT No.: PCT/EP2021/068731
§ 371 (c)(1),
(2) Date: Dec. 1, 2022

(87) PCT Pub. No.: WO2022/013023
PCT Pub. Date: Jan. 20, 2022

(65) Prior Publication Data
US 2023/0230207 A1 Jul. 20, 2023

(30) Foreign Application Priority Data
Jul. 13, 2020 (EP) .................... 20185454

(51) Int. Cl.
*G06V 10/00* (2022.01)
*G01R 33/48* (2006.01)
(Continued)

(52) U.S. Cl.
CPC ............ *G06T 5/70* (2024.01); *G01R 33/4818* (2013.01); *G06T 5/50* (2013.01); *G06T 7/11* (2017.01);
(Continued)

(58) Field of Classification Search
CPC . G06T 7/0012; G06T 7/11; G06T 5/50; G06T 5/70; G06T 5/90;
(Continued)

(56) References Cited

U.S. PATENT DOCUMENTS 5,531,520 A * 7/1996 Grimson ................ A61B 90/13
382/294
5,999,840 A * 12/1999 Grimson .................. G06T 3/14
606/130
(Continued)

FOREIGN PATENT DOCUMENTS

| JP | 2004187743 A | 7/2004 |
|----|--------------|--------|
| JP | 2012100955 A | 5/2012 |

(Continued)

OTHER PUBLICATIONS

Kharvi Pol R; RU2457503C2 Motion correction in positron emission/magnetic resonance hybrid imaging system; Publication Date: Jul. 27, 2012.*

(Continued)

*Primary Examiner* — Amir Alavi

(57) ABSTRACT

Disclosed herein is a medical system (100, 300) comprising a memory (110) storing machine executable instructions (120) and an image segmentation algorithm (122). The image segmentation algorithm is configured for outputting one or more predetermined anatomical regions within initial magnetic resonance imaging data (124) descriptive of a predetermined field of view (109) of a subject (318). The medical system further comprises a computational system (104), wherein execution of the machine executable instructions causes the computational system to: receive (200) the initial magnetic resonance imaging data (124); receive (202) the image segmentation comprising the one or more anatomical regions within the magnetic resonance imaging data in response to inputting the initial magnetic resonance (Continued)

imaging data into the image segmentation algorithm; select (204) at least one of the one or more anatomical regions as a selected image portion (128) using a predetermined criterion; and reduce (206) image intensity within the selected image portion to provide intensity corrected magnetic resonance imaging data.

18 Claims, 8 Drawing Sheets

(51) Int. Cl.
    *G06T 5/50*              (2006.01)
    *G06T 5/70*              (2024.01)
    *G06T 7/11*              (2017.01)

(52) U.S. Cl.
    CPC ............... *G06T 2207/10016* (2013.01); *G06T 2207/10096* (2013.01); *G06T 2207/20021* (2013.01); *G06T 2207/30048* (2013.01)

(58) Field of Classification Search
    CPC . G06T 2207/10016; G06T 2207/10088; G06T 2207/10096; G06T 2207/20021; G06T 2207/30048; G06T 2207/30068; G06T 2207/30096; G01R 33/4818
    See application file for complete search history.

(56) References Cited

U.S. PATENT DOCUMENTS

| | | | |
|---|---|---|---|
| 6,560,476 B1* | 5/2003 | Pelletier | G01R 33/56 |
| | | | 382/130 |
| 8,379,957 B2* | 2/2013 | Slabaugh | G06F 18/2323 |
| | | | 382/128 |
| 8,787,648 B2* | 7/2014 | Schulz | G06T 7/38 |
| | | | 382/131 |
| 9,098,912 B2* | 8/2015 | Kriston | G06T 7/0014 |
| 9,297,906 B2* | 3/2016 | Uhlemann | G01R 33/4808 |
| 9,318,032 B2* | 4/2016 | Samosky | G09B 23/28 |
| 10,937,158 B1* | 3/2021 | He | G06T 7/11 |
| 11,158,047 B2* | 10/2021 | Shah | G06T 7/11 |
| 2007/0036409 A1 | 2/2007 | Valadez et al. | |
| 2009/0067698 A1 | 3/2009 | Shinawawa et al. | |
| 2009/0069666 A1 | 3/2009 | Hermosillo et al. | |
| 2009/0080741 A1 | 3/2009 | Shinagawa et al. | |
| 2010/0061606 A1* | 3/2010 | Geiger | G16H 30/20 |
| | | | 382/128 |
| 2020/0410674 A1* | 12/2020 | Koch | G06N 3/045 |

FOREIGN PATENT DOCUMENTS

| | | |
|---|---|---|
| WO | 2010079519 A1 | 7/2010 |
| WO | 2018140596 A2 | 8/2018 |
| WO | 2019113712 A1 | 6/2019 |

OTHER PUBLICATIONS

Vignati "A Fully Automatic Lesion Detection Method for DCR-MRI Fat Suppressed Images" Medical Imaging Computer Aided Diagnosis Proc SPIE 7260.
Marrone et al "Breast Segmentation Using Fuzzy C-Means and Anatomical Priors in DCE-MRI" 2016 23rd Int. Conf. on Pattern Recognition, Dec. 4, 2016 p. 1472-1477.
International Search Report and Written Opinion from PCT/EP2021/068731 mailed Oct. 6, 2021.

* cited by examiner

IMAGE INTENSITY CORRECTION IN MAGNETIC RESONANCE IMAGING

CROSS REFERENCE TO RELATED APPLICATIONS

This application is a U.S. national phase application of International Application No. PCT/EP2021/068731 filed on Jul. 7, 2021, which claims the benefit of EP Application Serial No. 20185454.4 filed on Jul. 13, 2020 and is incorporated herein by reference.

FIELD OF THE INVENTION

The invention relates to magnetic resonance imaging, in particular to image intensity correction in magnetic resonance imaging.

BACKGROUND OF THE INVENTION

A large static magnetic field is used by Magnetic Resonance Imaging (MRI) scanners to align the nuclear spins of atoms as part of the procedure for producing images within the body of a patient. This large static magnetic field is referred to as the B0 field or the main magnetic field. Various quantities or properties of the subject can be measured spatially using MRI.

International patent application WO2010079519A1 discloses a method of identification of potential lesions of a breast from tomographic image datasets of a chest region of a patient, the-datasets comprising a plurality of voxels each having an intensity value, the images including a region of interest which comprises at least one breast. The method comprises the steps of: acquiring a set of images after the administration of a contrast agent to the patient; normalizing the intensity of voxels belonging to the region of interest of the acquired images according to at least one normalization factor; classifying each of the normalized voxels on the basis of a classification criterion, in such a way as to identify regions representing potential lesions. The method is characterized in that the normalization factor is based on normalization voxels corresponding to an anatomical structure, the normalization voxels having intensity values enhanced due to the administration of the contrast agent. The paper 'A fully automatic lesion detection method for DCR-MRI fat suppressed breast images' by A. Vignati in Medical Imaging 2009; Computer-Aided Diagnosis, Proc. SPIE 7260, 726026 reports on a DCE-MRI based automatic lesion detection. The known approach involves an image registration between the pre-contrast and contrast images to correct for motion between the pre- and contrast images. Then an anatomical segmentation is done to discard non-interesting contrast anatomical regions and a lesion decision algorithm is applied to the selected (i.e. non-discarded) clinical interesting regions.

SUMMARY OF THE INVENTION

The invention provides for a medical system, a computer program and a method in the independent claims. Embodiments are given in the dependent claims.

In magnetic resonance imaging, certain anatomical structures may become too bright. This may cause the intensity of other portions of the magnetic resonance image to be too dark in comparison. This may, for example, result in portions of the magnetic resonance image from becoming obscured. To overcome this difficulty some embodiments may use a segmentation algorithm to segment initial magnetic resonance imaging data into one or more anatomical regions. A predetermined criterion is then used to select some of the one or more anatomical regions as a selection image portion. The intensity within the selected image intensity within the anatomical region is then reduced to produce intensity corrected magnetic resonance imaging data. A uniformity correction may additionally be performed on the initial magnetic resonance image.

In one aspect the invention provides for a medical system that comprises a memory storing machine-executable instructions and an image segmentation algorithm. The image segmentation algorithm is configured for outputting one or more predetermined anatomical regions for initial magnetic resonance imaging data descriptive of a predetermined field of view of a subject.

The term 'initial' in initial magnetic resonance imaging data is a label to identify a particular magnetic resonance imaging data. The initial magnetic resonance imaging data is therefore magnetic resonance imaging data.

The image segmentation algorithm may be any of the standard image segmentation algorithms used for segmenting magnetic resonance imaging data. The actual image segmentation algorithm that is used would be chosen for the particular field of view or anatomical portion of the subject being imaged. Normally image segmentation algorithms are specifically designed to recognize particular anatomical regions within a region or field of view of the subject.

The image segmentation algorithm could for example be a template-based image segmentation algorithm, an anatomical atlas-based image segmentation algorithm, a deformable shape image segmentation or other model-based segmentation, a neural network-based image segmentation algorithm, or other algorithm.

The medical system further comprises a computational system. The computational system may take different forms in different examples. In one example the computational system may be a workstation with processors that is used by a medical professional for examining or rendering magnetic resonance images. In another example the computational system may be part of a magnetic resonance imaging system. In yet other examples, the computational system may be for example a cloud-based service that provides medical imaging processing.

Execution of the machine-executable instructions causes the computational system to receive the initial magnetic resonance imaging data. The initial magnetic resonance imaging data could for example be received by retrieving it from a storage or memory. In other examples the initial magnetic resonance imaging data could be received by controlling a magnetic resonance imaging system to acquire and then reconstruct the initial magnetic resonance imaging data. In yet other examples the initial magnetic resonance imaging data could for example be received via a network or internet connection. Execution of the machine-executable instructions further causes the computational system to receive the image segmentation comprising the one or more anatomical regions within the magnetic resonance imaging data in response to inputting the initial magnetic resonance imaging data into the image segmentation algorithm. In this step the initial magnetic resonance imaging data is input into the image segmentation algorithm and the image segmentation is output.

Execution of the machine-executable instructions further causes the computational system to select at least one or more anatomical regions as a selected image portion using a predetermined criterion. Execution of the machine-executable instructions further causes the computational system to reduce image intensity within the selected image portion to provide intensity corrected magnetic resonance imaging data. This embodiment may be beneficial because it may provide a magnetic resonance imaging data that is easier for a radiologist or other medical professional to understand and read.

Often times in magnetic resonance images there may be regions of the image which are extremely bright. This may reduce the contrast within other regions of the image to the point where the radiologist has a hard time discerning finer structure. Some prior solutions use masks to eliminate these brighter regions. This may be disadvantageous because completely removing these regions may make it more difficult for the radiologist to interpret the rest of the image. Also, the radiologist may have less confidence in the image if portions of the image have been removed or are missing due to the use of a mask.

It should be noted that in an embodiment the image intensity within the selected image portion is reduced to a non-zero value so that the image intensity is reduced but it is not equivalent to a mask. In another embodiment the image intensity is reduced so that anatomical structures within the selected image portion are still visible.

In another embodiment the image intensity within the selected image portion is reduced using a spatially varying weighting factor. The spatially varying weighting factor is smooth. This embodiment may be beneficial because it reduces the intensity but it does not do it in a fashion which is stepwise or very abrupt. This may result in intensity corrected magnetic resonance imaging data which reduces particularly bright portions on the image yet maintains a natural looking appearance and contains structures from both the darker and lighter regions.

In another embodiment the spatially varying weighting factor comprises a smooth transition at a boundary of the selected image portion. For example, there may be a small or limited transition region which extends beyond the selected image portion in some cases. This embodiment may also provide for intensity corrected magnetic resonance imaging data that looks more natural and is easier for a radiologist to interpret.

In another embodiment the spatially varying weighting factor is a polynomial.

In another embodiment the spatially varying weighting factor is an exponential function.

In another embodiment the spatially varying weighting factor is a power function.

In another embodiment execution of the machine-executable instructions further causes the computational system to perform a uniformity correction on the initial magnetic resonance imaging data before reducing the image intensity within at least the selected image portion. In another embodiment execution of the machine-executable instructions further causes the computational system to perform a uniformity correction on the intensity corrected magnetic resonance imaging data. In both this embodiment and the previous one, the uniformity correction is performed separate from the intensity correction. This may have the benefit of providing for better uniformity correction in regions outside of the selected image portion.

In another embodiment the intensity corrected magnetic resonance imaging data is provided during a weighted uniformity correction of the initial magnetic resonance imaging data. The image intensity within the selected image portion is reduced by down weighting the selected image portion for the weighted uniformity correction with the spatially varying weighting factor. This embodiment may be beneficial because the performing of the intensity and uniformity corrections at the same time may result in an image which has superior image intensity and uniformity correction. The correction of the intensity may have an effect on the signal-to-noise for particular regions of the image. Performing both of these at the same time with a weighting factor may enable the performance of both the intensity and uniformity correction in a manner which results in balancing a trade off between correcting the uniformity and the intensity in a way which reserves the ability to interpret the magnetic resonance image properly.

In another embodiment the initial magnetic resonance imaging data is dynamic magnetic resonance imaging data that comprises a time series of magnetic resonance images. The intensity corrected magnetic resonance imaging data is provided by reducing image intensity within the selected image portion for each of the time series of the magnetic resonance images. Execution of the machine-executable instructions further causes the computational system to calculate a dynamic magnetic resonance image using the intensity corrected magnetic resonance imaging data. Dynamic magnetic resonance imaging data is magnetic resonance imaging data which describes a process which changes over time.

To enable the intensity corrected magnetic resonance imaging data to be useful in reconstructing the dynamic magnetic resonance image, the selected image portion is treated uniformly for each of the time series of the magnetic resonance images. For example, the intensity within the selected image portion may be reduced by the same factor throughout the time series of magnetic resonance images. The identification or location of the selected image portion may be identical voxels within each of the time series of magnetic resonance images.

In another embodiment the dynamic weighted magnetic resonance imaging data is dynamic contrast enhanced magnetic resonance imaging data. This embodiment may be particularly beneficial because typically the contrast agent for the dynamic contrast enhanced magnetic resonance imaging data is injected into the subject. This for example may make regions like the heart have a much larger intensity than the rest of the magnetic resonance image because the bulky blood volume pumped by the heart contains the contrast agent. Intensity corrected magnetic resonance imaging data may then result in a dynamic magnetic resonance image, in this case a dynamic contrast enhanced magnetic resonance image that is much easier to interpret.

In another embodiment the selected image portion comprises a heart anatomical region. As was mentioned above, when performing dynamic contrast enhanced imaging the heart may have a particularly large intensity with respect to the rest of the magnetic resonance image.

In another embodiment the image intensity within at least the selected image portion is reduced by a factor determined by applying a predetermined factor. For example, the predetermined factor may be decided for a particular region of interest or magnetic resonance imaging protocol that was used.

In another embodiment the image intensity within the selected image portion was reduced by a factor determined by using an optimization to limit a reduction of contrast determined by a noise level and/or coil sensitivity within the selected image portion. The coil sensitivity and the noise level may affect how readable a region of the magnetic resonance image is. If the intensity within the selected image portion is reduced too much, then the signal-to-noise level may make it so that the structure within the selected image portion is obscured by noise. This embodiment therefore provides a means of having a tradeoff between reducing the intensity within the selected image portion and also maintaining its readability by limiting how much is reduced so that the noise level or coil sensitivities do not make the selected image portion unreadable.

In another embodiment the predetermined criterion for selecting the selected image portion is a selection of anatomical regions with an average image intensity above a predetermined intensity threshold. In this embodiment if the image intensity is too large then it is selected to be reduced.

In another embodiment the predetermined criterion for selecting the selected image portion is to maintain a noise level below a predetermined noise threshold within the selected image portion. Limiting the noise level below the predetermined noise threshold may be used to ensure that the noise does not obscure information within the selected image portion.

In another embodiment the predetermined criterion for selecting the selected image portion is a predetermined selection of the one or more anatomical regions. For example, if a particular magnetic resonance imaging protocol is being performed it may be known in advance that this region would be too bright or have too large of an intensity. An example, which is given above, is a dynamic contrast enhanced magnetic resonance imaging protocol where the contrast agent first goes to the heart. In this case it would be known in advance that the heart anatomical region would be too bright. In this case it could then just be added to the predetermined selection.

In another embodiment the medical system further comprises a magnetic resonance imaging system configured for acquiring k-space data from an imaging zone. The memory further comprises pulse sequence commands configured to control the magnetic resonance imaging system to acquire the k-space data from the predetermined field of view within the imaging zone. Execution of the machine-executable instructions further causes the computational system to control the magnetic resonance imaging system with the pulse sequence commands to acquire the k-space data. Execution of the machine-executable instructions further causes the computational system to reconstruct the initial magnetic resonance imaging data from the k-space data.

In another aspect the invention provides for a method of medical imaging. The method comprises receiving the initial magnetic resonance imaging data. The method further comprises receiving the image segmentation comprising the one or more anatomical regions within the magnetic resonance imaging data in response to inputting the initial magnetic resonance imaging data into an image segmentation algorithm. The image segmentation algorithm is configured for outputting one or more predetermined anatomical regions within initial magnetic resonance imaging data descriptive of a predetermined field of view of a subject. The method further comprises selecting at least one of the one or more anatomical regions as a selected image portion using a predetermined criterion. The method further comprises reducing image intensity within the selected image portion to provide intensity corrected magnetic resonance imaging data.

In another aspect the invention provides for a computer program comprising machine-executable instructions for execution by a computational system. The computer program may for example be a computer program product which is stored on a memory or other storage device such as a non-transitory storage or memory device. Execution of the machine-executable instructions causes the computational system to receive initial magnetic resonance imaging data. Execution of the machine-executable instructions further causes the computational system to receive the image segmentation comprising the one or more anatomical regions within the magnetic resonance imaging data in response to inputting the initial magnetic resonance imaging data into an image segmentation algorithm.

The image segmentation algorithm is configured for outputting the one or more predetermined anatomical regions for or in the initial magnetic resonance imaging data descriptive of a predetermined field of view of a subject. Execution of the machine-executable instructions further causes the computational system to select at least one of the one or more anatomical regions as a selected image portion using a predetermined criterion. Execution of the machine-executable instructions further causes the computational system to reduce image intensity within the selected image portion to provide intensity corrected magnetic resonance imaging data.

In another embodiment the image intensity within the selected image portion is reduced using a spatially varying weighting factor. The spatially varying weighting factor is smooth. The spatially varying weighting factor comprises a smooth transition at a boundary of the selected image portion.

It is understood that one or more of the aforementioned embodiments of the invention may be combined as long as the combined embodiments are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor or computational system of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the computational system of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the computational system. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a computational system. 'Computer storage' or 'storage' is a further example of a computer-readable storage medium. Computer storage is any non-volatile computer-readable storage medium. In some embodiments computer storage may also be computer memory or vice versa.

A 'computational system' as used herein encompasses an electronic component which is able to execute a program or machine executable instruction or computer executable code. References to the computational system comprising the example of "a computational system" should be interpreted as possibly containing more than one computational system or processing core. The computational system may for instance be a multi-core processor. A computational system may also refer to a collection of computational systems within a single computer system or distributed amongst multiple computer systems. The term computational system should also be interpreted to possibly refer to a collection or network of computing devices each comprising a processor or computational systems. The machine executable code or instructions may be executed by multiple computational systems or processors that may be within the same computing device or which may even be distributed across multiple computing devices.

Machine executable instructions or computer executable code may comprise instructions or a program which causes a processor or other computational system to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly. In other instances, the machine executable instructions or computer executable code may be in the form of programming for programmable logic gate arrays.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a computational system of a general purpose computer, special purpose computer, or other programmable data processing apparatus to produce a machine, such that the instructions, which execute via the computational system of the computer or other programmable data processing apparatus, create means for implementing the functions/acts specified in the flowchart and/or block diagram block or blocks.

These machine executable instructions or computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The machine executable instructions or computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

A 'hardware interface' as used herein encompasses an interface which enables the computational system of a computer system to interact with and/or control an external computing device and/or apparatus. A hardware interface may allow a computational system to send control signals or instructions to an external computing device and/or apparatus. A hardware interface may also enable a computational system to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

K-space data is defined herein as being the recorded measurements of radio frequency signals emitted by atomic spins using the antenna of a Magnetic resonance apparatus during a magnetic resonance imaging scan.

A Magnetic Resonance Imaging (MRI) imaging data or an MR image is defined herein as being the reconstructed two- or three-dimensional visualization of anatomic data contained within the magnetic resonance imaging data. This visualization can be performed using a computer.

BRIEF DESCRIPTION OF THE DRAWINGS

In the following preferred embodiments of the invention will be described, by way of example only, and with reference to the drawings in which.

DESCRIPTION OF EMBODIMENTS

Like numbered elements in these figures are either equivalent elements or perform the same function. Elements which have been discussed previously will not necessarily be discussed in later figures if the function is equivalent.

Figure 1:
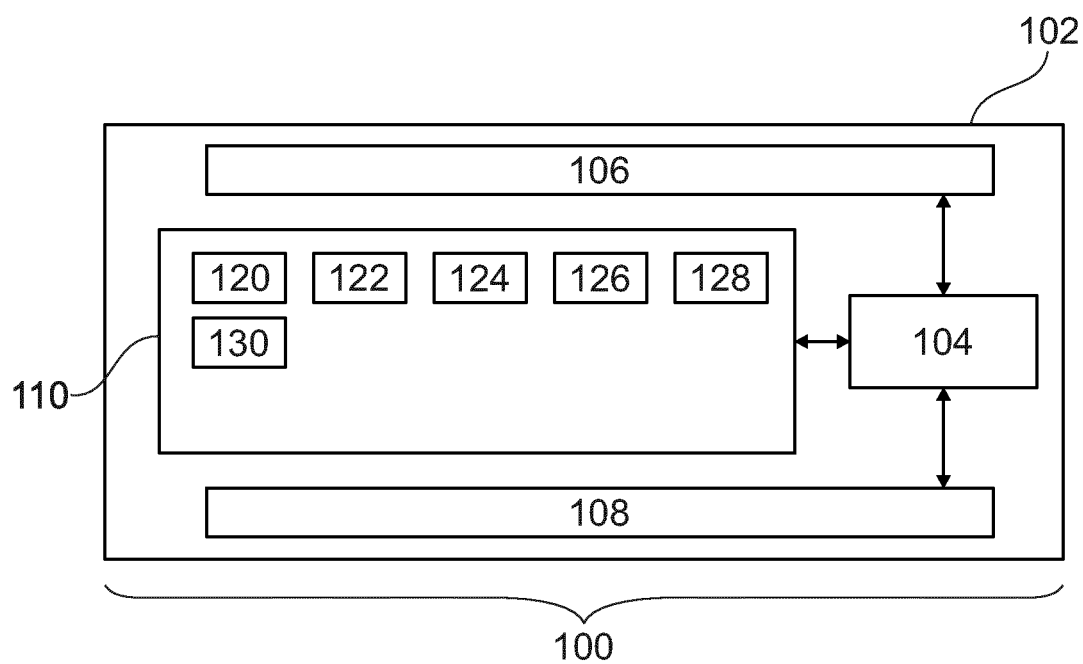
FIG. 1 illustrates an example of a medical system.

FIG. 1 illustrates an example of a medical system 100. The medical system 100 in this example is shown as comprising a computer 102. The computer 102 may represent one or more computer systems that are in one location or are distributed. The computer 102 is shown as containing a computational system 104. The computational system 104 may for example be one or more processing cores that are located at one or more locations. The computational system 104 is shown as being connected to an optional hardware interface 106. The hardware interface 106 may for example be used to connect the computational system 104 with other components of the medical system 100 if they are present. The hardware interface 106 may enable the computational system 104 to control such components.

The computer 102 is further shown as comprising an optional user interface 108. The user interface 108 may for example be used by an operator to control the operation and function of the medical system 100. The medical system 100 could be a standalone computer system but it could also be integrated into a magnetic resonance imaging system.

The computer 102 is further shown as comprising a memory 110. The memory 110 is intended to represent any combination of memory or storage device which is accessible to the computational system 104. The memory 110 may include volatile and non-volatile memory storage means and components.

The memory 110 is shown as containing machine-executable instructions 120. The machine-executable instructions 120 may be configured to enable the computational system 104 to perform basic data and image processing tasks such as reconstructing magnetic resonance images. The machine-executable instructions 120 may also in some examples contain code which enables the computational system to control other components via the optional hardware interface 106.

The memory 110 is further shown as containing image segmentation algorithm 122. The image segmentation algorithm 122 may be a standard magnetic resonance imaging image segmentation algorithm that is configured for outputting one or more predetermined anatomical regions for an initial magnetic resonance imaging data. This may be for a particular field or view or anatomical region of the subject.

The memory 110 is further shown as containing the initial magnetic resonance imaging data 124. The memory 110 is further shown as containing an image segmentation 126 that has been received from the image segmentation algorithm 122 by inputting the initial magnetic resonance imaging data 124. The memory 110 is further shown as containing a selected image portion 128. This is one or more regions or anatomical regions that have been identified in the image segmentation 126. The selected image portion 128 may for example be selected using a predetermined criterion that is applied to the image segmentation 126. The memory 110 is further shown as containing an intensity corrected magnetic resonance imaging data 130 that has been constructed by reducing the image intensity within the selected image portion 128 for the initial magnetic resonance imaging data 124.

Figure 2:
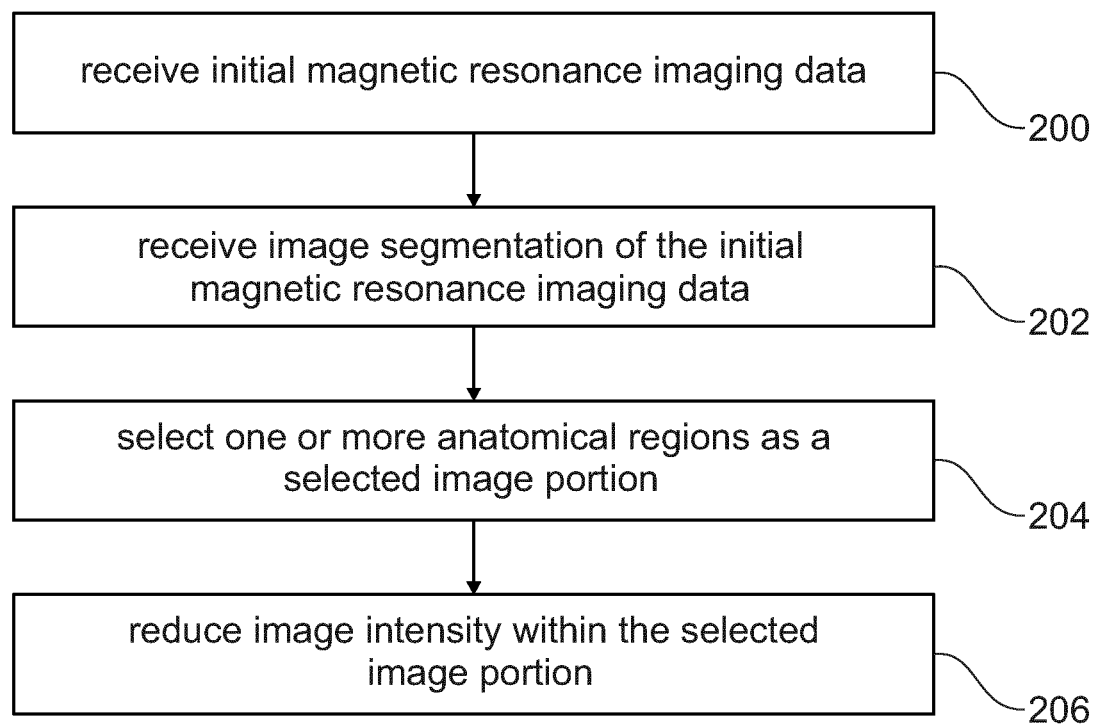
FIG. 2 shows a flow chart which illustrates a method of using the medical system of FIG. 1.

FIG. 2 shows a flowchart which illustrates a method of operating the medical system 100 of FIG. 1. First, in step 200, the initial magnetic resonance imaging data 124 is received. Next, in step 202, the image segmentation 126 is received. The image segmentation was received from the image segmentation algorithm 122 after inputting the initial magnetic resonance imaging data 124. Next, in step 204, the selected image portion 128 is determined by applying a predetermined criterion to the image segmentation 126. Finally, in step 206, the intensity corrected magnetic resonance imaging data 130 is provided by reducing the image intensity within the initial magnetic resonance imaging data 124 for the selected image portion 128.

Figure 3:
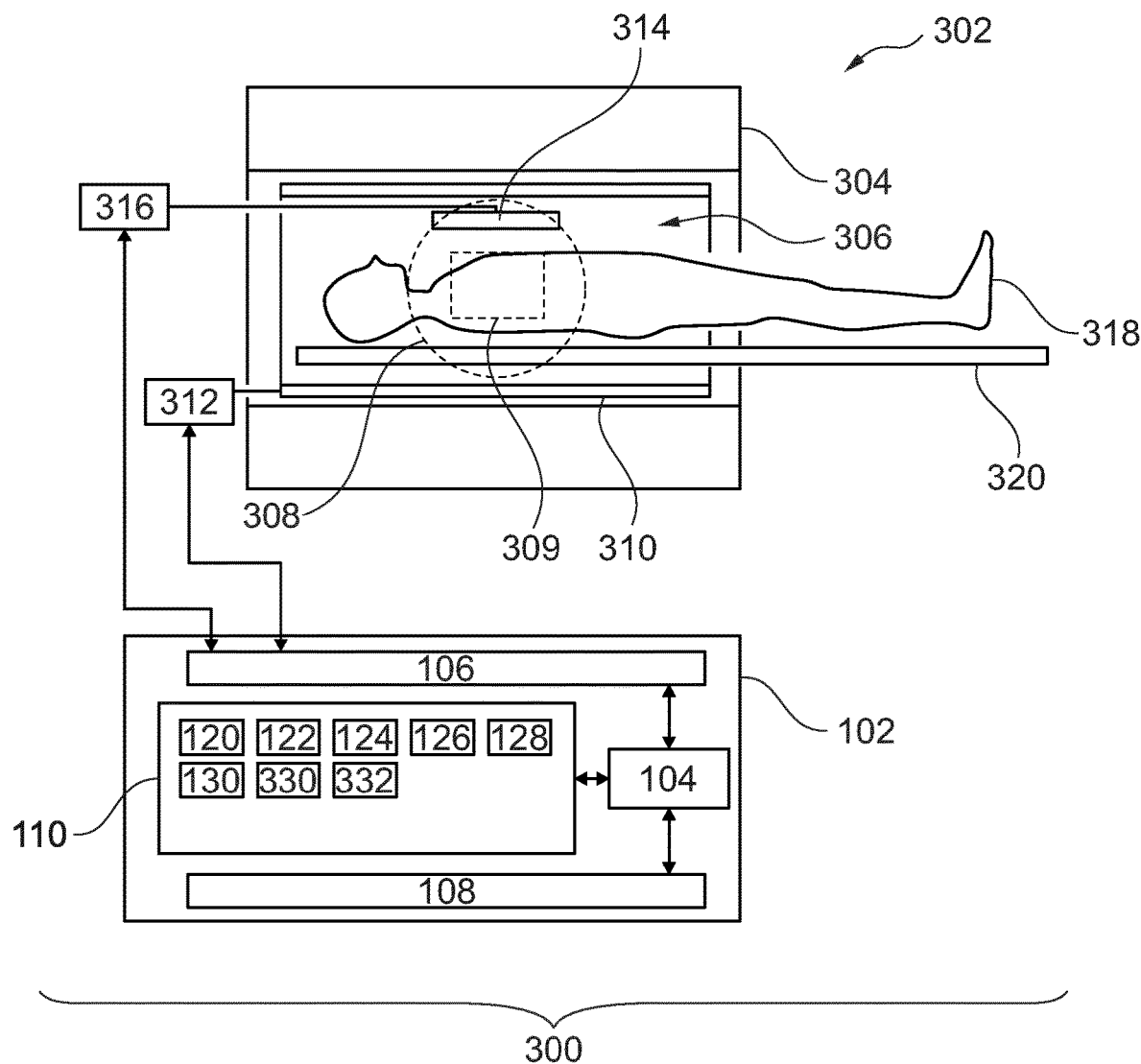
FIG. 3 illustrates a further example of a medical system.

FIG. 3 illustrates a further example of a medical system 300. The medical system 300 is similar to the medical system 100 in FIG. 1 except that it additionally comprises a magnetic resonance imaging system 302 that is controlled by the computational system 104.

The magnetic resonance imaging system 302 comprises a magnet 304. The magnet 304 is a superconducting cylindrical type magnet with a bore 306 through it. The use of different types of magnets is also possible; for instance it is also possible to use both a split cylindrical magnet and a so called open magnet. A split cylindrical magnet is similar to a standard cylindrical magnet, except that the cryostat has been split into two sections to allow access to the iso-plane of the magnet, such magnets may for instance be used in conjunction with charged particle beam therapy. An open magnet has two magnet sections, one above the other with a space in-between that is large enough to receive a subject: the arrangement of the two sections area similar to that of a Helmholtz coil. Open magnets are popular, because the subject is less confined. Inside the cryostat of the cylindrical magnet there is a collection of superconducting coils.

Within the bore 306 of the cylindrical magnet 304 there is an imaging zone 308 where the magnetic field is strong and uniform enough to perform magnetic resonance imaging. A region of interest 309 is shown within the imaging zone 308. The magnetic resonance data that is acquired typically acquired for the region of interest. A subject 318 is shown as being supported by a subject support 320 such that at least a portion of the subject 318 is within the imaging zone 308 and the region of interest 309.

Within the bore 306 of the magnet there is also a set of magnetic field gradient coils 310 which is used for acquisition of preliminary magnetic resonance data to spatially encode magnetic spins within the imaging zone 308 of the magnet 304. The magnetic field gradient coils 310 connected to a magnetic field gradient coil power supply 312. The magnetic field gradient coils 310 are intended to be representative. Typically magnetic field gradient coils 310 contain three separate sets of coils for spatially encoding in three orthogonal spatial directions. A magnetic field gradient power supply supplies current to the magnetic field gradient coils. The current supplied to the magnetic field gradient coils 310 is controlled as a function of time and may be ramped or pulsed.

Adjacent to the imaging zone 308 is a radio-frequency coil 314 for manipulating the orientations of magnetic spins within the imaging zone 308 and for receiving radio transmissions from spins also within the imaging zone 308. The radio frequency antenna may contain multiple coil elements. The radio frequency antenna may also be referred to as a channel or antenna. The radio-frequency coil 314 is connected to a radio frequency transceiver 316. The radio-frequency coil 314 and radio frequency transceiver 316 may be replaced by separate transmit and receive coils and a separate transmitter and receiver. It is understood that the radio-frequency coil 314 and the radio frequency transceiver 316 are representative. The radio-frequency coil 314 is intended to also represent a dedicated transmit antenna and a dedicated receive antenna. Likewise the transceiver 316 may also represent a separate transmitter and receivers. The radio-frequency coil 314 may also have multiple receive/transmit elements and the radio frequency transceiver 316 may have multiple receive/transmit channels. For example if a parallel imaging technique such as SENSE is performed, the radio-frequency could 314 will have multiple coil elements.

The transceiver 316 and the gradient controller 312 are shown as being connected to the hardware interface 106 of the computer system 102.

The memory 110 is shown as containing pulse sequence commands 330. The pulse sequence commands are commands or data which can be converted into commands which can be used to control the magnetic resonance imaging system 302 to acquire k-space data 332. The memory 110 is further shown as comprising k-space data 332 that has been acquired by controlling the magnetic resonance imaging system 302 with the pulse sequence commands 330. The computational system 104 may also reconstruct the initial magnetic resonance imaging data 124 from the k-space data 332.

Figure 4:
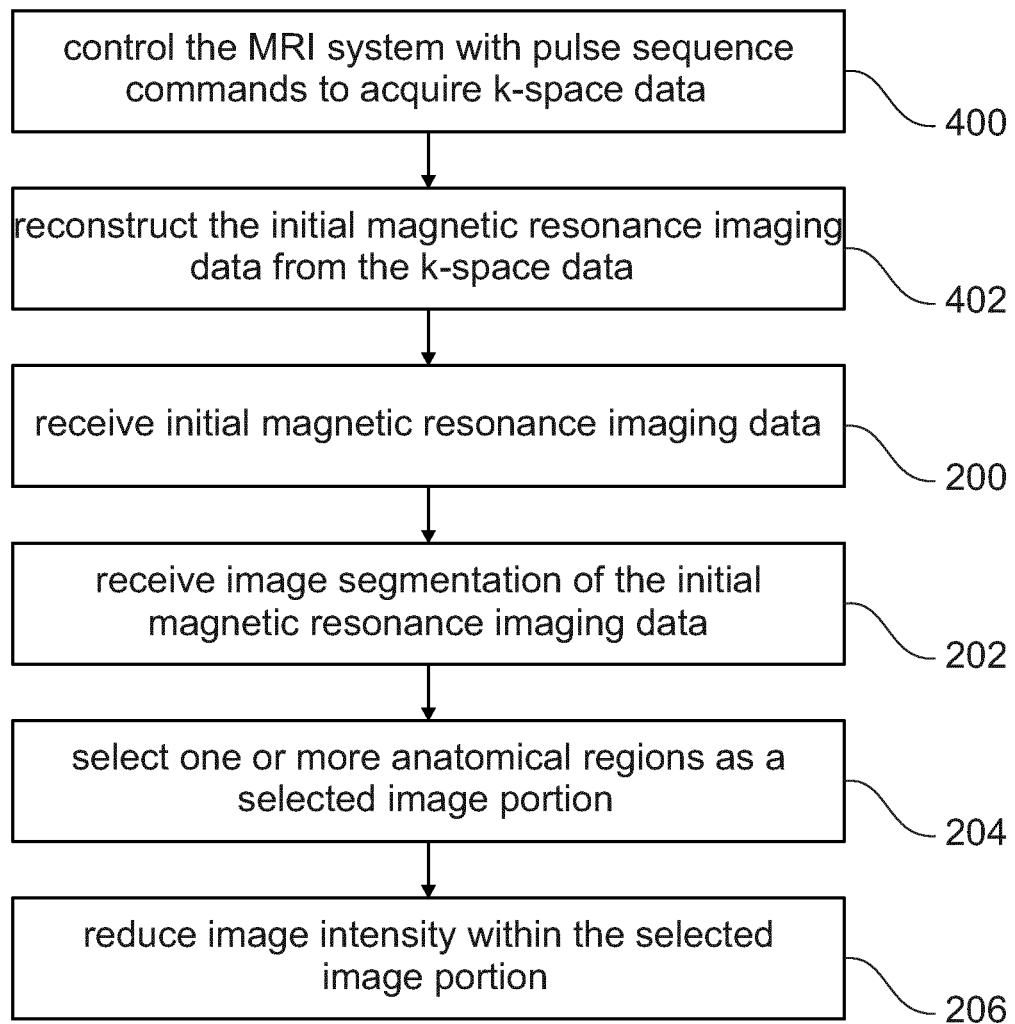
FIG. 4 shows a flow chart which illustrates a method of using the medical system of FIG. 3.

FIG. 4 shows a flowchart which illustrates a method of operating the medical system 300 of FIG. 3. The method illustrated in FIG. 4 is similar to the method illustrated in FIG. 2. It comprises several additional steps. The method starts with step 400. In step 400 the magnetic resonance imaging system 302 is controlled with the pulse sequence commands 330 to acquire the k-space data 332. After step 400, in step 402, the initial magnetic resonance imaging data 124 is reconstructed from the k-space data 332. After step 402, the method then proceeds to perform steps 200, 202, 204, and 206 as was illustrated in FIG. 2.

From basic perspective, one would say an MRI image should be as uniform as possible to separate tissues and potential lesions. However, when certain structures become too bright with respect to the background, these structures might obscure the detectability of lesions. For example, in dynamic contrast enhanced imaging of breast, contrast arrives first in the heart. When the image is made completely uniform, the heart overwhelms the rest of the image making it very difficult to deduce all information from the image. Examples may segment structures (the selected image portion 126 of the image segmentation 126) obscuring the rest of the image. While the rest of the image is made completely uniform, the segmented part (the selected image portion 126) is reduced or even, in some examples, completely removed such that the structure does not obscure anymore. A reduction has the benefit that the complete anatomy can still be recognized as it might still contain relevant information.

This may have the benefit of increasing the readability of images by having an optimal uniformity over the most relevant structures while less relevant structures can still be viewed. This may further have the benefit of providing for a system that requires less windowing operations with an optimal workflow and may provide for easier diagnosis.

Lesions are detected and characterized based on structure and contrast differences compared to the surroundings. A uniform image in which equal contrast over the whole images will be beneficial for an optimal comparison within the image. However, in MRI, non-uniformities exist not just because of contrast differences between tissues, but also inherent to the acquisition strategy and hardware being used like the receive coil. The imprint of the receive coil can be corrected for, e.g. via the CLEAR method. CLEAR is an acronym for "constant level appearance," and achieves homogeneity correction in MRI images by using previously acquired coil sensitivity maps. The term PURE is another acronym which is equivalent to CLEAR.

As was describe above, a perfectly uniform contrast is not always beneficial. Certain structures can become too overwhelming and with that destroy the easiness of reading of images. Take the example of dynamic contrast enhanced breast imaging. This is most often performed in axial orientation. Contrast arrives first in the heart. As the heart contains a lot of blood, it becomes enormously bright determining the contrast and window settings of the given image. To avoid a too bright heart, users decide not to do any uniformity correction. This will cause the heart to become far less bright as a breast coil is not sensitive in that area. The downside is that the breast will become inhomogeneous, which makes it hard to assess the breasts from that perspective.

Examples may segment the heart and/or any other obstructing tissue and downweight it in the uniformity correction. One could even completely remove it from the image, making the image non-rectangular in principle. Complete removal is not always the most optimal result as still relevant information needs to be retrieved from the segmented structures. In the breast case, still the time point of contrast arrival in the heart is relevant to note the time difference in contrast arrival in the heart and potential lesions.

By segmenting and downweighing the obscuring structures in the final image, the readability of the images is improved. This may potentially have the benefit of:

More confidence

Shorter reading times

Less mouse clicks/movements as windowing becomes a lot more easy

Examples may possibly combine one or more of the following steps:

(optionally) Apply uniformity correction

Segment structures that are too apparent hampering the readability

Downweight those structures such that they become less apparent or even completely remove them.

This is just an example order, the uniformity correction can also be applied after the downweighing.

Figure 5:
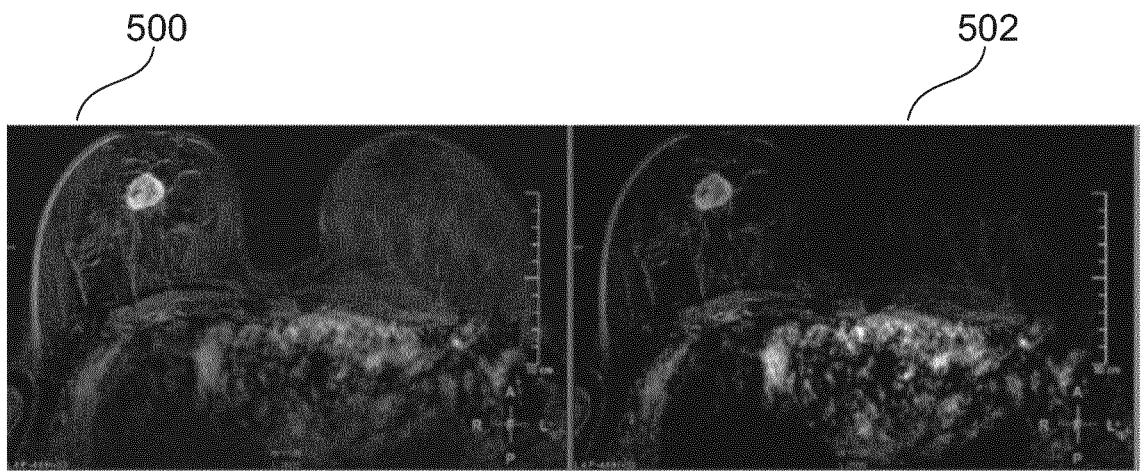
FIG. 5 shows several magnetic resonance images.
Figure 5:
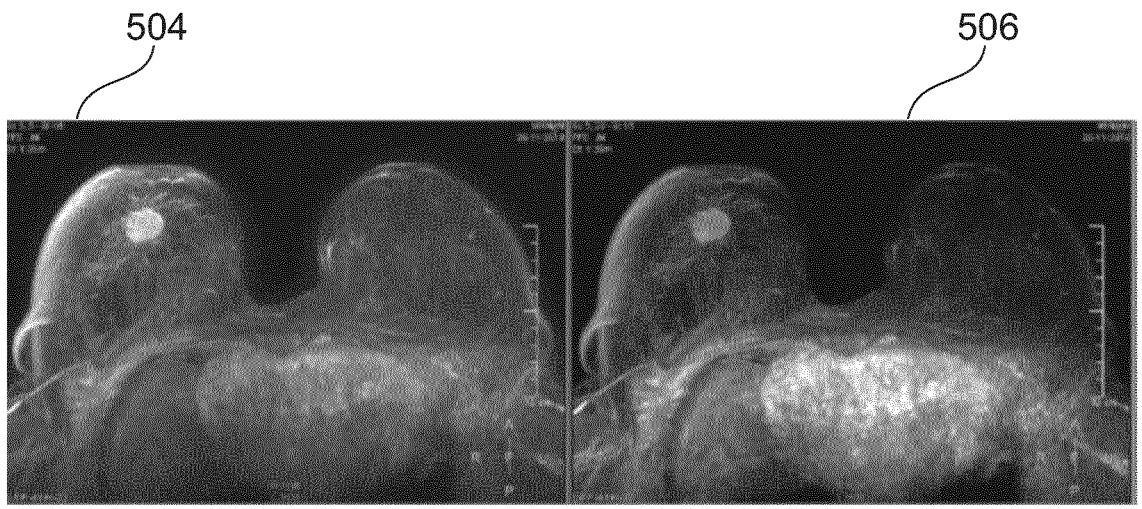

FIG. 5 shows four different magnetic resonance images. Image 500 is a dynamic contrast enhanced magnetic resonance image. Image 502 has been reconstructed from the same data as image 500 but it is an intensity corrected dynamic contrast enhanced magnetic resonance image 502. Image 504 is a maximum intensity projection in the axial direction magnetic resonance image. Image 506 has been reconstructed from the same data as image 504 but it has been intensity corrected and image 506 is therefore an intensity corrected maximum intensity projection in the axial direction magnetic resonance image.

Figure 6:
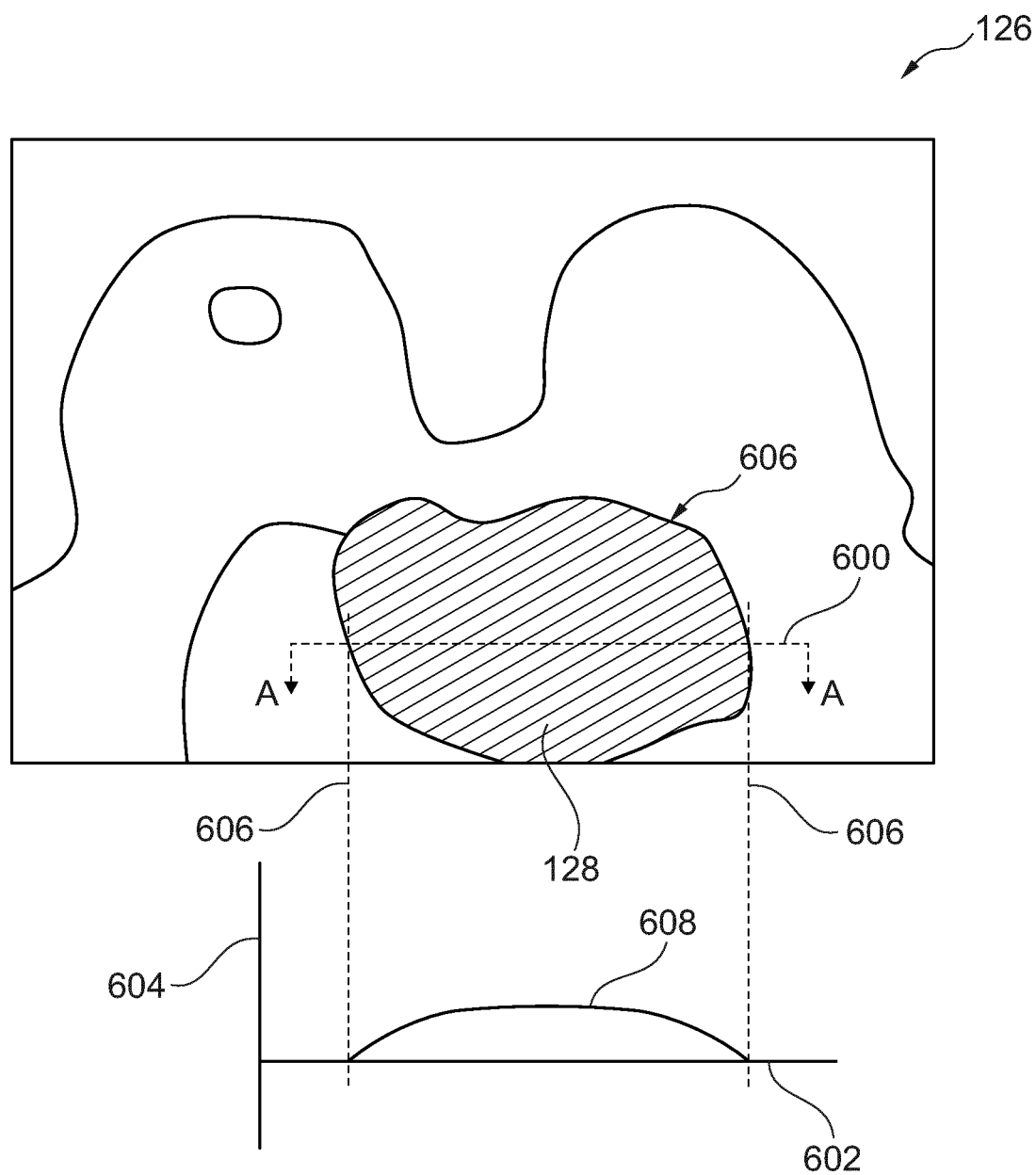
FIG. 6 illustrates an example of a spatially varying weighting factor.

FIG. 6 is an example of a breast case is provided showing the bright heart (selected image portion 128). Images 500 and 504 have hardly any correction. Images 502 and 506 use a CLEAR correction. In both cases the lesion is bright and large and clearly visible. Nevertheless, the CLEAR image clearly shows the bright heart 128 and the difficulty of windowing due to this high signal.

Images 500 and 504 provides good contrast, but they are inhomogeneous. In this case the inhomogeneity is not really apparent as a 4-channel coil is used. With a 7 of 16 channel coil, the intrinsic non-uniformity is far larger and the obtained image cannot be used without a uniformity correction.

FIG. 6 illustrates an idealization of an image segmentation 126 such as could be made for any of the images 500, 502, 504, and 506. Within the image segmentation 126 there is an identification of a selected image portion 128. There is a cross-section line 600 between a and a. Below the segmentation 126 is a plot of the position along aa 602 versus an intensity reduction factor 604. The line 608 between the boundary 606 of the selected image portion 128 represents a spatially varying weighting factor 608. In the example in FIG. 6 the spatially varying weighting factor 608 is only within the selected image portion 128. Variations of the spatially varying weighting factor 608', 608" are shows in FIGS. 7 and 8 below. The spatially varying weighting factors are shows as being weighting factors which are positive in value. Depending upon how they are used, they could be transformed to be negative. They could also be transformed to be a scaling factor used to reduce intensity. In this case the scaling factor could for example be one minus the displayed spatially varying weighting factor 608, 608', 608".

Figure 7:
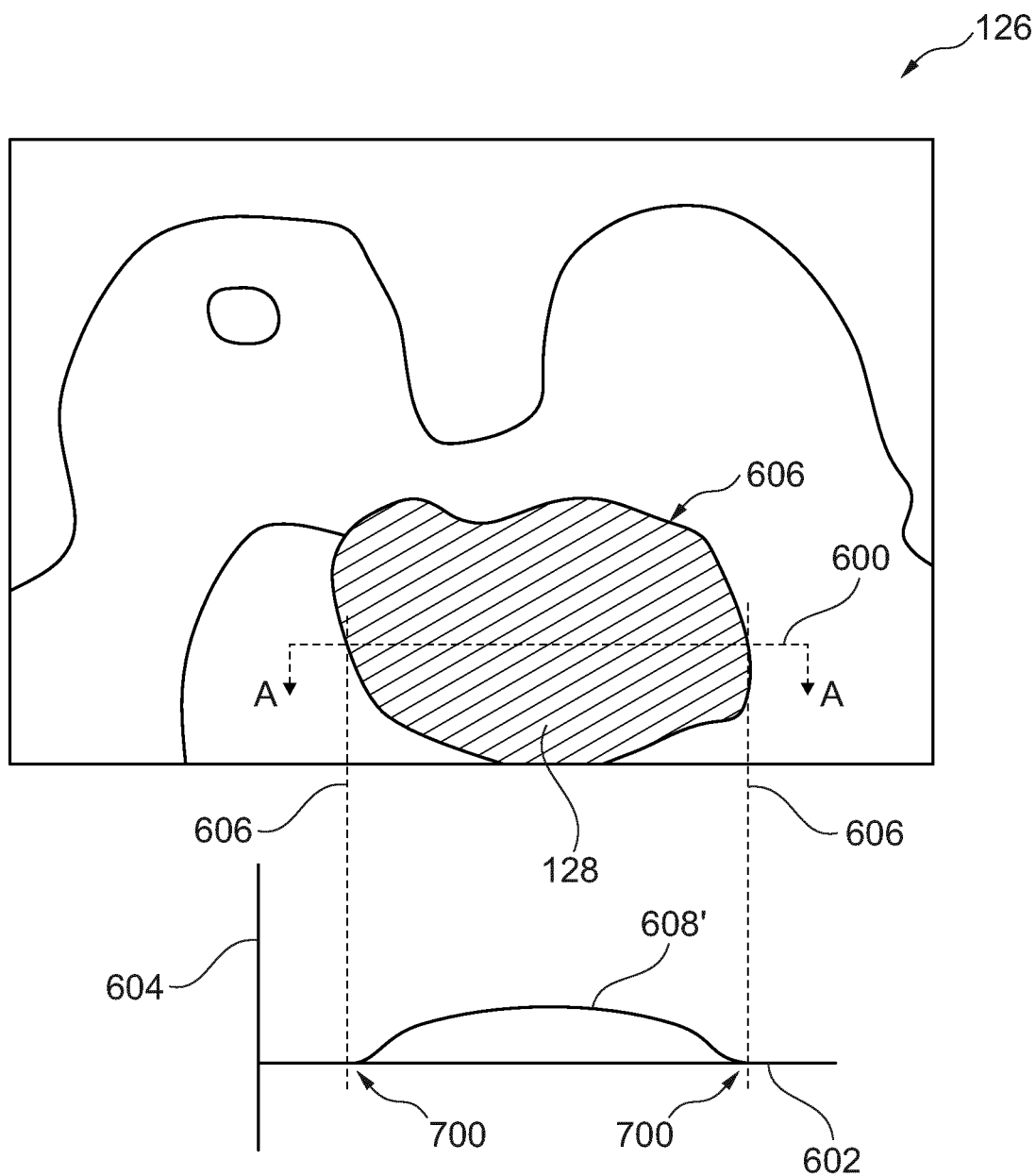
FIG. 7 illustrates a further example of a spatially varying weighting factor.

FIG. 7 shows a plot of the same image segmentation 126 as was shown in FIG. 6. However, in the example in FIG. 7 the spatially varying weighting factor 608' is different. In this example at the boundary 606 of the selected image portion 128 there is a smooth transition 700 at the boundary 606. The advantage of FIG. 7 is that the smooth transition 700 may result in a more natural looking intensity corrected magnetic resonance imaging data 130.

Figure 8:
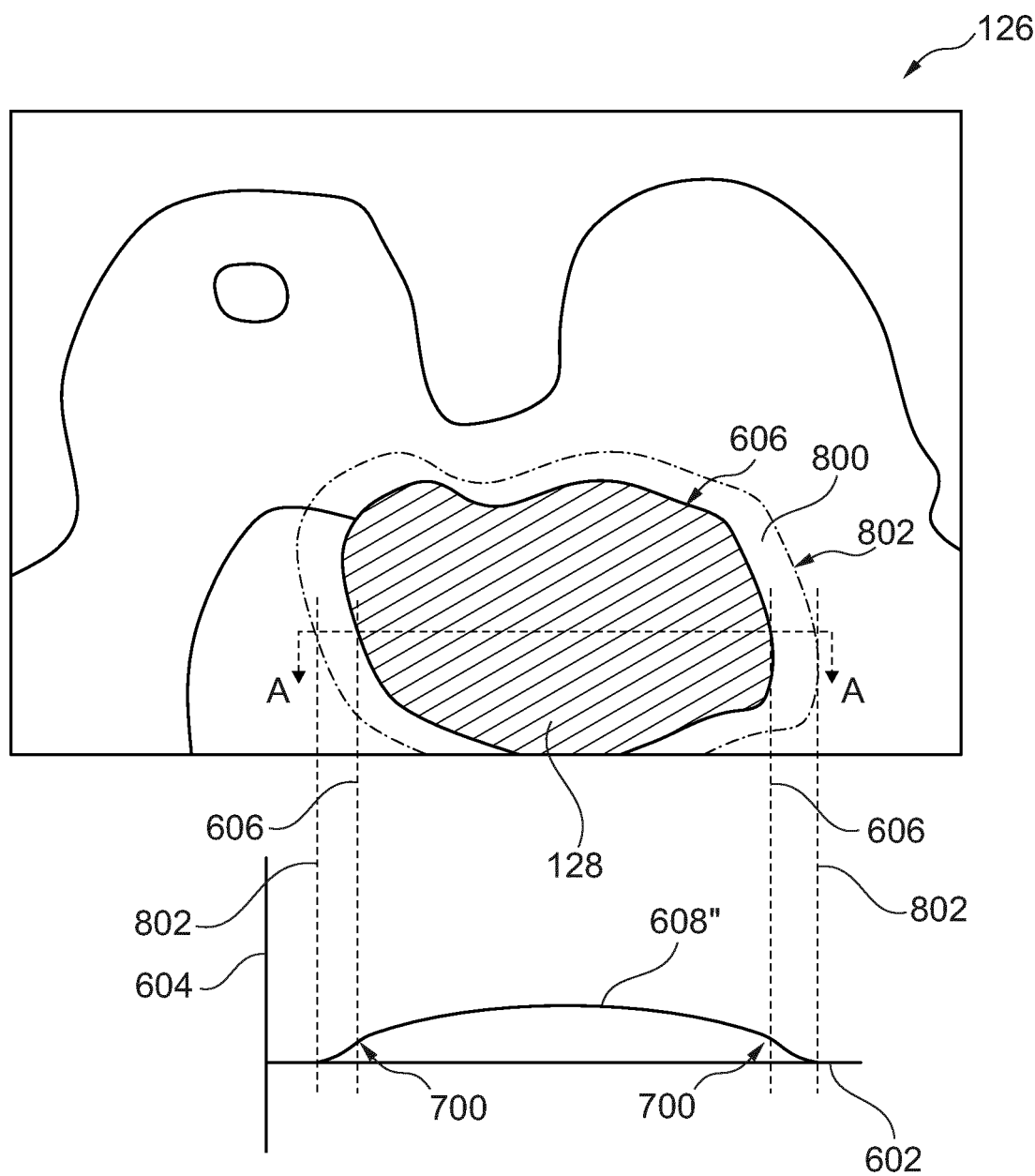
FIG. 8 illustrates a further example of a spatially varying weighting factor.

FIG. 8 shows a further view of the image segmentation 126 illustrated in FIGS. 6 and 7. In FIG. 8 the spatially varying weighting factor 608" is different from those shown in FIGS. 6 and 7. It is similar to the spatially varying weighting factor 608' that is shown in FIG. 7 in that there is again a smooth transition 700 at the boundary 606 of the selected image portion 128. However, in this example, there is a transition zone 800 that surrounds the selected image portion 128. The spatially varying weighting factor 608" has a transition between the boundary of the transition zone 802 and the boundary 606 of the selected image portion 128.

The boundary of the transition zone 802 could be defined to be a chosen distance or chosen number of voxels away from the boundary 606 of the selected image portion. Typically, the chosen number of voxels will be relatively small such as 10 or fewer voxels. The chosen distance could be a choice of voxels that corresponds to less than 1 cm or less than 0.5 cm.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

REFERENCE SIGNS LIST 100 medical system
102 computer
104 computational system
106 optional hardware interface
108 optional user interface
110 memory
120 machine executable instructions
122 image segmentation algorithm
124 initial magnetic resonance imaging data
126 image segmentation 128 selected image portion
130 intensity corrected magnetic resonance imaging data
200 receive the initial magnetic resonance imaging data
202 receive the image segmentation comprising the one or more anatomical regions within the magnetic resonance imaging data in response to inputting the initial magnetic resonance imaging data into the image segmentation algorithm
204 select at least one of the one or more anatomical regions as a selected image portion using a predetermined criterion
206 reduce image intensity within the selected image portion to provide intensity corrected magnetic resonance imaging data
300 medical system
302 magnetic resonance imaging system
304 magnet
306 bore of magnet
308 imaging zone
309 region of interest
310 magnetic field gradient coils
312 magnetic field gradient coil power supply
314 radio-frequency coil
316 transceiver
318 subject
320 subject support
330 pulse sequence commands
332 k-space data
400 control the magnetic resonance imaging system with the pulse sequence commands to acquire the k-space data
402 reconstruct the initial magnetic resonance imaging data from the k-space data
500 dynamic contrast enhanced magnetic resonance image
502 intensity corrected dynamic contrast enhanced magnetic resonance image
504 maximum intensity projection in axial direction magnetic resonance image
506 intensity corrected maximum intensity projection in axial direction magnetic resonance image
600 cross section line A-A
602 position along A-A
604 intensity reduction factor
606 boundary of selected image portion
608 spatially varying weighting factor
608' spatially varying weighting factor
608" spatially varying weighting factor
700 smooth transition
800 transition zone
802 boundary of transition zone

The invention claimed is:

1. A medical system comprising:
a memory configured to store machine executable instructions and an image segmentation algorithm, wherein the image segmentation algorithm is configured to output one or more predetermined anatomical regions within initial magnetic resonance imaging data descriptive of a predetermined field of view of a subject;
a computational system, wherein execution of the machine executable instructions causes the computational system to:
receive the initial magnetic resonance imaging data;
receive an image segmentation comprising the one or more anatomical regions within the magnetic resonance imaging data in response to inputting the initial magnetic resonance imaging data into the image segmentation algorithm;
select at least one of the one or more anatomical regions as a selected image portion using a predetermined criterion; and
reduce image intensity within the selected image portion to provide intensity corrected magnetic resonance imaging data, such that anatomical structures within the selected image portion are still visible, wherein the image intensity within the selected image portion is reduced using a spatially varying weighting factor, wherein the spatially varying weighing factor is smooth.

2. The medical system of claim 1, wherein the spatially varying weighting factor comprises a smooth transition at a boundary of the selected image portion.

3. The medical system of claim 1, wherein execution of the machine executable instructions further causes the computational system to perform at least one of the following: perform a uniformity correction on the initial magnetic resonance imaging data before reducing the image intensity within at least the selected image portion or perform a uniformity correction on the intensity corrected magnetic resonance imaging data.

4. The medical system of claim 1, wherein the intensity corrected magnetic resonance imaging data is provided during a weighted uniformity correction of the initial magnetic resonance imaging data, wherein the image intensity within the selected image portion is reduced by down weighting the selected image portion for the weighted uniformity correction with the spatially varying weighting factor.

5. The medical system of claim 1, wherein the initial magnetic resonance imaging data is dynamic magnetic resonance imaging data comprising a time series of magnetic resonance images, wherein the intensity corrected magnetic resonance imaging data is provided by reducing image intensity within the selected image portion for each of the time series of magnetic resonance images, wherein execution of the machine executable instructions further causes the computational system to calculate a dynamic magnetic resonance image using the intensity corrected magnetic resonance imaging data.

6. The medical system of claim 5, wherein the dynamic weighted magnetic resonance imaging data is dynamic contrast enhanced magnetic resonance imaging data.

7. The medical system of claim 6, wherein the selected image portion comprises a heart anatomical region.

8. The medical system of claim 1, wherein the image intensity within at least the selected image portion is reduced using a factor determined by any one of the following:
by applying a predetermined factor;
using an optimization to limit a reduction of contrast determined by a noise level and/or coil sensitivity within the selected image portion.

9. The medical system of claim 8, wherein the predetermined criterion used to select the selected image portion is at least one of the following:
a selection of anatomical regions with an average image intensity above a predetermined intensity threshold;
maintaining a noise level below a predetermined noise threshold within the selected image portion; or
a predetermined selection of the one or more anatomical regions.

10. The medical system of claim 1, wherein the medical system further comprises a magnetic resonance imaging system configured to acquire k-space data from an imaging zone, wherein the memory further comprises pulse sequence commands configured to control the magnetic resonance imaging system to acquire the k-space data from the predetermined field of view within the imaging zone, wherein execution of the machine executable instructions further causes the computational system to:

control the magnetic resonance imaging system with the pulse sequence commands to acquire the k-space data; and reconstruct the initial magnetic resonance imaging data from the k-space data.

11. A method of medical imaging, wherein the method comprises:

receiving initial magnetic resonance imaging data;

receiving an image segmentation comprising the one or more anatomical regions within the magnetic resonance imaging data in response to inputting the initial magnetic resonance imaging data into an image segmentation algorithm wherein the image segmentation algorithm is configured to output the one or more predetermined anatomical regions within initial magnetic resonance imaging data descriptive of a predetermined field of view of a subject;

selecting at least one of the one or more anatomical regions as a selected image portion using a predetermined criterion; and reducing image intensity within the selected image portion to provide intensity corrected magnetic resonance imaging data, such that anatomical structures within the selected image portion are still visible, wherein the image intensity within the selected image portion is reduced using a spatially varying weighting factor wherein the spatially varying weighing factor is smooth, and wherein the spatially varying weighting factor comprises a smooth transition at a boundary of the selected image portion.

12. The method of claim 11 further comprising: performing at least one of a uniformity correction on the initial magnetic resonance imaging data before reducing the image intensity within at least the selected image portion or a uniformity correction on the intensity corrected magnetic resonance imaging data.

13. The method of claim 11, wherein the intensity corrected magnetic resonance imaging data is provided during a weighted uniformity correction of the initial magnetic resonance imaging data, wherein the image intensity within the selected image portion is reduced by down weighting the selected image portion for the weighted uniformity correction with the spatially varying weighting factor.

14. The method of claim 11, wherein the initial magnetic resonance imaging data is dynamic magnetic resonance imaging data comprising a time series of magnetic resonance images, wherein the intensity corrected magnetic resonance imaging data is provided by reducing image intensity within the selected image portion for each of the time series of magnetic resonance images, wherein execution of the machine executable instructions further causes the computational system to calculate a dynamic magnetic resonance image using the intensity corrected magnetic resonance imaging data.

15. A computer program comprising machine executable instructions stored on a non-transitory computer readable medium for execution by a computational system, wherein execution of the machine executable instructions causes the computational system to:

receive initial magnetic resonance imaging data;

receive an image segmentation comprising the one or more anatomical regions within the magnetic resonance imaging data in response to inputting the initial magnetic resonance imaging data into an image segmentation algorithm, wherein the image segmentation algorithm is configured to output one or more predetermined anatomical regions for initial magnetic resonance imaging data descriptive of a predetermined field of view of a subject;

select at least one of the one or more anatomical regions as a selected image portion using a predetermined criterion; and reduce image intensity within the selected image portion to provide intensity corrected magnetic resonance imaging data, such that anatomical structures within the selected image portion are still visible, wherein the image intensity within the selected image portion is reduced using a spatially varying weighting factor wherein the spatially varying weighing factor is smooth, and wherein the spatially varying weighting factor comprises a smooth transition at a boundary of the selected image portion.

16. The computer program of claim 15 further comprising: performing at least one of a uniformity correction on the initial magnetic resonance imaging data before reducing the image intensity within at least the selected image portion or a uniformity correction on the intensity corrected magnetic resonance imaging data.

17. The computer program of claim 15, wherein the intensity corrected magnetic resonance imaging data is provided during a weighted uniformity correction of the initial magnetic resonance imaging data, wherein the image intensity within the selected image portion is reduced by down weighting the selected image portion for the weighted uniformity correction with the spatially varying weighting factor.

18. The computer program of claim 15, wherein the initial magnetic resonance imaging data is dynamic magnetic resonance imaging data comprising a time series of magnetic resonance images, wherein the intensity corrected magnetic resonance imaging data is provided by reducing image intensity within the selected image portion for each of the time series of magnetic resonance images, wherein execution of the machine executable instructions further causes the computational system to calculate a dynamic magnetic resonance image using the intensity corrected magnetic resonance imaging data.

\* \* \* \* \*